US010708718B1

(12) United States Patent
Zavesky et al.

(10) Patent No.: US 10,708,718 B1
(45) Date of Patent: Jul. 7, 2020

(54) SPACE CHARACTERIZATION USING ELECTROMAGNETIC FIELDS

(71) Applicant: AT&T Intellectual Property I, L.P., Atlanta, GA (US)

(72) Inventors: Eric Zavesky, Austin, TX (US); James Pratt, Round Rock, TX (US); Donald Perciful, Round Rock, TX (US); Yupeng Jia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/288,439

(22) Filed: Feb. 28, 2019

(51) Int. Cl.
*H04W 4/33* (2018.01)
*H04W 4/029* (2018.01)

(52) U.S. Cl.
CPC ............ *H04W 4/029* (2018.02); *H04W 4/33* (2018.02)

(58) Field of Classification Search
CPC ............ H04W 4/70; H04W 4/02; H04W 4/04
USPC .......................................... 455/456.1–456.3
See application file for complete search history.

(56) References Cited

U.S. PATENT DOCUMENTS

| | | | |
|---|---|---|---|
| 7,369,229 B2 | 5/2008 | Bissett, III et al. | |
| 7,515,105 B2 | 4/2009 | Whalley et al. | |
| 8,279,119 B2 | 10/2012 | Elwell, Jr. et al. | |
| 8,355,680 B2 | 1/2013 | Nyu | |
| 8,433,337 B2 | 4/2013 | Chin | |
| 9,262,788 B1 | 2/2016 | Freeman et al. | |
| 9,541,641 B2 | 1/2017 | Stolarczyk et al. | |
| 9,645,234 B2 | 5/2017 | Khan et al. | |
| 2009/0213009 A1 | 8/2009 | Ishiwatari et al. | |
| 2012/0173204 A1 | 7/2012 | Padmanabhan et al. | |
| 2012/0190977 A1 | 7/2012 | Persson et al. | |
| 2013/0172010 A1 | 7/2013 | Kang et al. | |
| 2013/0187777 A1* | 7/2013 | Bennett | G08B 13/08 340/545.6 |
| 2016/0238690 A1 | 8/2016 | Colucci et al. | |
| 2016/0258759 A1* | 9/2016 | Matthews | G01S 19/42 |
| 2017/0307735 A1 | 10/2017 | Rohani et al. | |
| 2018/0106896 A1 | 4/2018 | Rohani et al. | |
| 2018/0149737 A1 | 5/2018 | Kim et al. | |
| 2018/0275277 A1 | 9/2018 | Li et al. | |
| 2018/0324393 A1* | 11/2018 | Ryan | H04N 7/188 |

FOREIGN PATENT DOCUMENTS

| | | |
|---|---|---|
| WO | WO 2016/142837 A1 | 9/2016 |
| WO | WO 2018/073422 A2 | 4/2018 |
| WO | WO 2018/157571 A1 | 9/2018 |
| WO | WO 2018/211261 A1 | 11/2018 |

OTHER PUBLICATIONS

Rainer Mautz; "Overview of Current Indoor Positioning Systems"; Geodezija ir Kartografija; vol. 35.1; 2009; p. 18-22.

* cited by examiner

*Primary Examiner* — Sam Bhattacharya
(74) *Attorney, Agent, or Firm* — BakerHostetler (57) ABSTRACT

The space characterization system may obtain readings from devices with electromagnetic (EM) field radios. Based on the readings, static and moving objects may be detected. The space characterization system may allow EM-based sensing of objects and room configuration, which may be based on collaboration of devices with EM radios across different EM spectra.

20 Claims, 7 Drawing Sheets

SPACE CHARACTERIZATION USING ELECTROMAGNETIC FIELDS

BACKGROUND

Conventionally, indoor mapping is relegated to manually targeting specific Wi-Fi signals, Bluetooth beacons, or visual fiducial (e.g. barcode) markers. These techniques usually need significant initial human annotation during setup and usually do not provide usable intelligence for the contents and placement of objects in a room or space.

SUMMARY

The space characterization system disclosed herein may obtain readings from devices with electromagnetic (EM) field radios (e.g. radios of internet of things devices, mobile phones, laptops, base stations, etc.). Based on these readings, static and moving objects may be detected. The space characterization system may allow EM-based sensing of objects and room configuration, which may be based on a collaboration of devices with EM radios across different EM spectra.

In an example, an apparatus, such a server, base station, or mobile device, may include a processor and a memory coupled with the processor that effectuates operations. The operations may include obtaining wireless device information from a plurality of devices; determining a location of each device of the plurality of devices based on the wireless device information; determining a subset of the plurality of devices based on a threshold location; determining an obstruction in an area within the threshold location based on comparing the wireless device information of each device of the subset of the plurality of devices; and based on the determined obstruction in the area, generating a map of the area that includes a representation of the obstruction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

There is an increased need for high-quality maps of internal spaces and the objects therein. Conventionally, indoor mapping is relegated to manually targeting specific Wi-Fi signals, Bluetooth beacons, or visual fiducial (e.g. barcode) markers. These techniques usually need significant initial human annotation during setup and usually do not provide usable intelligence for the contents and placement of objects in a room or space. Other methods, rooted in computer vision may be costly, based on multiple cameras or expensive simultaneous localization and mapping feature alignment, and often low-quality because there usually are only a few contributors to generating the maps.

The space characterization system may obtain readings from devices with electromagnetic (EM) field radios (e.g. radios on internet of things devices, mobile phones, laptops, base stations, etc.). With these readings, static and moving objects may be detected. The space characterization system allows for EM-based sensing of objects and room configuration, which may be based on collaboration of devices with EM radios across different EM spectra.

Figure 1:
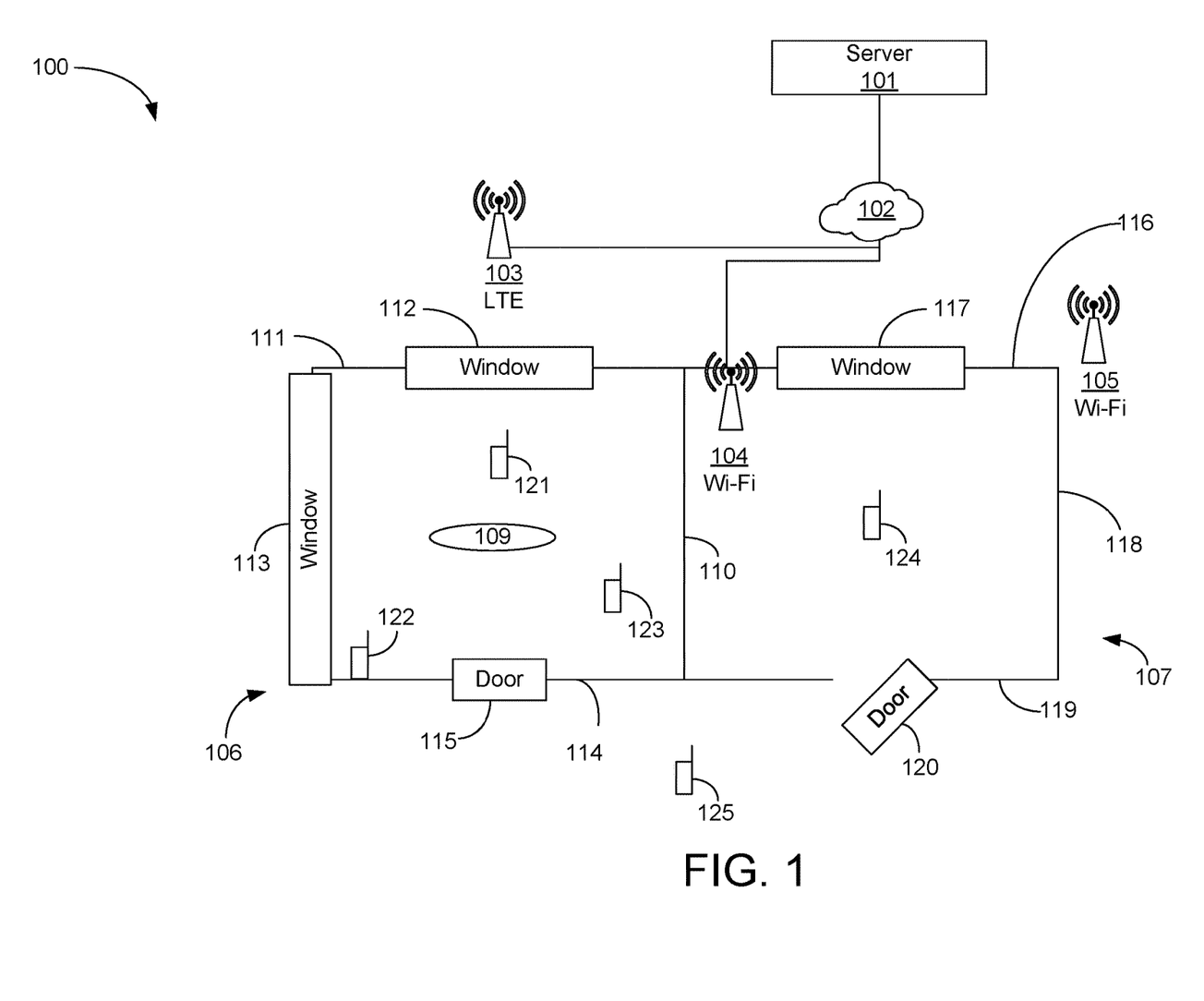
FIG. 1 illustrates an exemplary system for space characterization.

FIG. 1 illustrates an exemplary system 100 that may implement space characterization as disclosed herein. System 100 may include multiple wireless devices, such as mobile device 121—mobile device 125. The wireless devices may include internet of things (IoT) devices (e.g., wireless thermostat), mobile phones, or laptops, among other things. System 100 may also include base station 103—base station 105 (e.g., Wi-Fi, LTE, or 5G) that may be communicatively connected with server 101 by connecting with network 102. Server 101 may be used to obtain and process wireless device information for the space characterization disclosed herein. Base station 104 may be located in room 107, base station 105 may be located outside of room 107 (near wall 118), and base station 103 may be located outside room 107 and room 108. FIG. 1 also shows an overhead view of adjacent rooms, room 106 and room 107, that may be in a building. Room 106 may be bound by window 113, wall 111, wall 110, and wall 114, wherein wall 110 is shared with room 107. Wall 111 may include window 112 near the middle of the wall 111, while wall 114 may include door 115 near the middle of the wall 114. Room 107 may be bound by wall 118, wall 116, wall 110, and wall 119, wherein wall 110 is shared with room 106. Wall 116 may include window 117 near the middle of the wall 116, while wall 119 may include door 120 near the middle of the wall 119. Doors and walls may be made of any material, such as wood or sheet rock, while the windows are usually made of glass or an empty space. It is contemplated that room 107 and room 108 may have more objects within, but for simplicity they are not shown herein.

Figure 2:
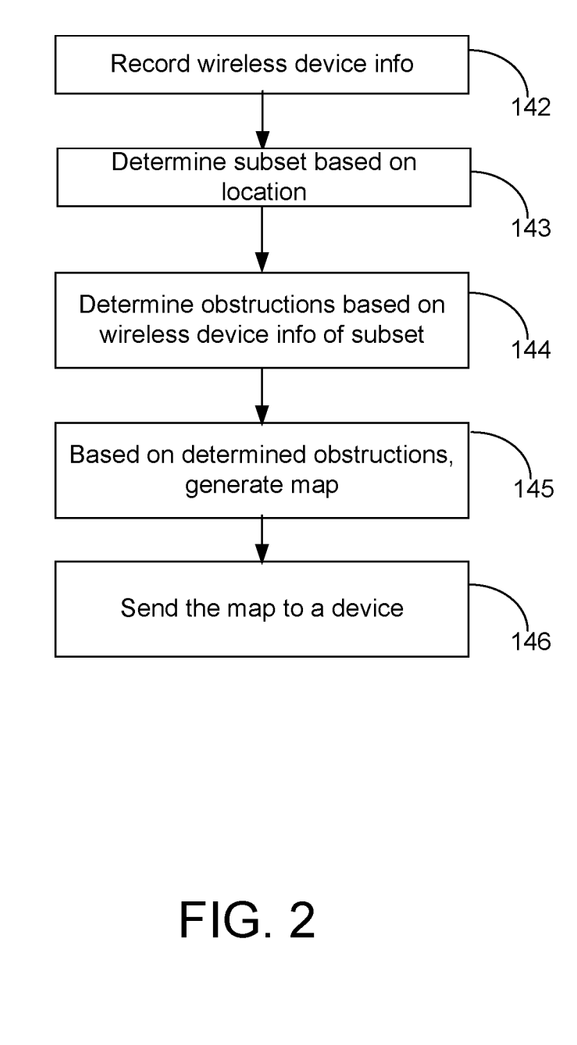
FIG. 2 illustrates an exemplary method for space characterization.

FIG. 2 illustrates an exemplary method for implementing space characterization as disclosed herein. At step 141, wireless device information may be obtained from a plurality of devices (e.g., base station 103 or mobile device 121). With reference to FIG. 1, for example, server 101 may obtain and process wireless device information from base station 103—base station 105 and mobile device 121—mobile device 125. The wireless device information may be periodically obtained (e.g., every 10 seconds or every 10 minutes). The wireless device information may be signal strength information (e.g., received signal strength indictor—RSSI), wireless device identifier (ID), location information (e.g., GPS information), accelerometer information, barometer information, altimeter information (e.g., altitude), or gyroscope information, among other things. It is contemplated herein that the signal strength or wireless device ID, among other things, may be based on connected devices or discoverable devices.

With continued reference to FIG. 2, at step 142, the location of each of the plurality of devices is determined based on the wireless device information of step 141. For example, a global positioning system (GPS) may provide location information that includes the longitude and latitude of mobile device 121, while altimeter information may be used to determine the altitude of mobile device 121, which may in turn may assist in determining what floor of a building mobile device 121 is located, among other things. It is contemplated herein that other wireless device information may be used for similar reasons to provide the location of mobile device 121. At step 143, a subset of the plurality of devices may be determined based on a threshold location parameter. For example, base station 104 may be used as a center point when determining a threshold location (e.g., threshold radius of 100 feet around base station 104) for characterizing a space. In an example, the threshold location may be based on GPS information for horizontal space and altimeter information for vertical space. It is contemplated herein that this step 143 and other steps may be iterative and each device (e.g., mobile device 121—mobile device 125 or the base stations) may be a central location that may be used in a map for space characterization in which the multiple maps are overlaid in an iterative process.

At step 144, an area (e.g., space within a threshold radius) is characterized based on comparing wireless device information of each device of the subset of the plurality of devices. Characterization of the area may include determining objects (also referred herein as obstructions) in the area, such as walls, windows, desks, doors, ceilings, floors, or devices, among other things. The type of obstruction and the material of the obstruction may be determined. In an example, the determining the type of obstruction may include: obtaining the type of EM radio emitted (e.g., spectrum used) from mobile device 121; determining the actual signal strength, based on the type of signal, between each device of the subset of the plurality of devices in view of locations; and determining the expected signal strength signal strength, based on the type of signal, between each device of the subset of the plurality of devices in view of locations (e.g., predetermined value considering no obstruction or significantly adverse condition). The interference properties of possible obstructions may be used to determine what an obstruction is made of (e.g., wood, glass, sheetrock, etc.). The type of obstruction may include a wall, chair, desk, computing device, window, etc. It is contemplated herein that wireless device information may further include type of wireless devices, such as mobile phone, M2M sensor/thermostat, laptop, desktop, LAN base station, WAN base station, cameras, sensors, etc.

At step 145, based on the determined based on the characterization of step 144 generating a map of the area, which may include obstructions, as discussed herein. The map may be a heat map that shows, via color or numerical information or the like, the likelihood of obstructions throughout the mapped area. In addition, the method herein may be iterative and incorporate machine learning algorithms in order to increase the accuracy of the generated map over time. In another example, the likelihood of objects being statically placed in a location may also be rendered via a heat map. Specifically, if an object appears to have EM interference characteristics similar to humans or animals, the system many annotate that obstruction in a different fashion because it is more likely to move. In yet another example, the recency of updates for an object (e.g., when was a characterization step last applied to this area of the map) may be visualized with a similar heat map or likelihood representation.

At step 146, the generated map may be sent to other devices. The other devices may display the map or otherwise use the map (e.g., use in navigation for a robot or the like). Subsequently the generated map may be annotated to indicate type of obstructions, type of materials, etc., which may help during the iterative process, such as when using machine learning algorithms or the like.

Figure 3:
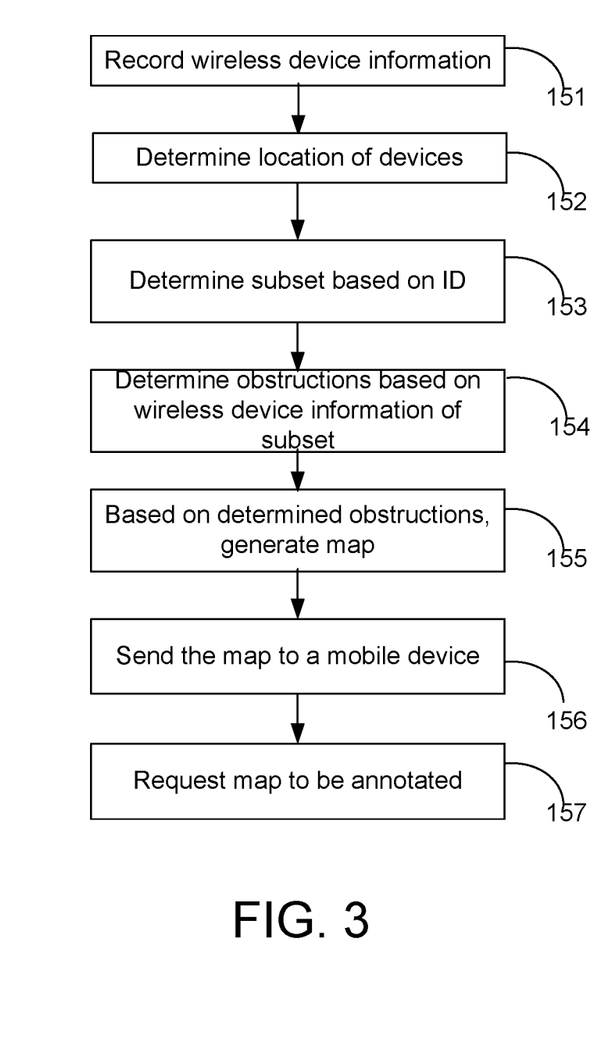
FIG. 3 illustrates an exemplary method for space characterization based on wireless device identifiers.

FIG. 3 illustrates an exemplary method for implementing space characterization with reference to wireless IDs. At step 151, wireless device information may be obtained from a plurality of devices (e.g., base station 103 or mobile device 121). With reference to FIG. 1, for example, server 101 may obtain wireless device information from base station 103—base station 105 or mobile device 121—mobile device 125. The wireless device information may be periodically obtained (e.g., every 10 seconds or every 10 minutes). The wireless device information may be signal strength information, wireless device identifier (ID), location information (e.g., GPS information), accelerometer information, barometer information, altimeter information, or gyroscope information, among other things. It is contemplated herein that the signal strength or wireless device ID, among other things, may be based on connected devices or discoverable devices. For example, mobile device 121 may be connected to base station 104 and transfer data, but mobile device 121 may receive wireless device information from base station 105 (e.g., Wi-Fi) or mobile device 123, which are discoverable and not connected with mobile device 121.

A space characterization system may leverage different spectrum and frequency bands on one or more devices. For example, the usage of 5G millimeter wave (such as 20 GHz and above, also known as band) and traditional 3G/4G (which lack high frequency spectrum components) may be used singularly or in parallel on the same device. Other technologies may also utilize multiple radios or channels singularly or in parallel such as multipath component communication that are included in operation of a device (such as 5G mobile devices).

With continued reference to FIG. 3, at step 152, the location of each of the plurality of devices may be determined based on the wireless device information of step 151. For example, location of mobile device 121 may be determined based on global positioning system (GPS), Bluetooth beacons, or triangulation while devices form mesh networking to locally determine location, among other things.

At step 153, a subset of the plurality of devices may be determined based on commonality of an identifier during a period. For example, server 101 may use the ID of mobile device 121 when determining the wireless device information to analyze for characterizing a space. In an example, mobile device 121 may be able to detect wireless device information from mobile device 122, mobile device 123, base station 104, and mobile device 124. Alternatively, mobile device 125 may be able to detect wireless device information from mobile device 121, mobile device 123, mobile device 124, and base station 104. As can be observed in this example, mobile device 125 detects mobile device 121, but mobile device 121 does not detect mobile device 125. Defining the area of analysis in view wireless device ID rather than location (e.g., via GPS) may be beneficial in capturing a fuller picture of the propagation characteristics of a space (e.g., with regard to unusual EM radio propagation due to materials or floor layouts), particularly when devices do not have GPS or the like to assist in determining a location of wireless device or defining the space. It is contemplated herein that this step 153 and other steps may be iterative and each device (e.g., mobile device 121—mobile device 125 or the base stations) or method (e.g., method of FIG. 2) may be used in a map for space characterization (e.g., multiple overlaid maps of the iterative process).

At step 154, an area (e.g., space within a threshold radius) is characterized based on comparing wireless device information of each device of the subset of the plurality of devices. Characterization of the area may include determining obstructions in the area, such as walls, windows, desks, doors, ceilings, floors, or devices, among other things. The type of obstruction and the material of the obstruction may be determined. In an example, the determining the type of obstruction may include: obtaining the type of EM radio emitted (e.g., Wi-Fi, Bluetooth, LTE, 5G or other spectrum used) from mobile device 121; determining the actual signal strength, based on the type of signal, between each device of the subset of the plurality of devices in view of locations; and determining the expected signal strength signal strength, based on the type of signal, between each device of the subset of the plurality of devices in view of locations (e.g., predetermined value considering no obstruction or significantly adverse condition). The wireless interference properties of possible obstructions may be used to determine the material an obstruction is made of (e.g., wood, glass, sheetrock, etc.). There may be predetermined reflection and transmission losses through building or other materials that may be used in determining the obstruction. The properties of materials may include density or composition (e.g., composition of wood, metal, or etc.). It is contemplated herein that wireless device information may further include type of wireless devices, such as mobile phone, M2M sensor/thermostat, laptop, desktop, LAN base station, WAN base station, etc.

At step 155, based on the characterization of step 154, a map of the area may be generated. The map may include obstructions, as discussed herein. Again, the map may be a heat map that shows, via color or numerical information or the like, the likelihood of obstructions throughout the mapped area. In addition, the method herein may be iterative and incorporate machine learning algorithms in order to increase the accuracy of the generated map over time. Note continuous and iterative calculations and generations of maps based on any of the thresholds of wireless device information (e.g., accelerometer information, barometer, etc.), which may be mixed and matched (e.g., threshold barometer information and gyroscope information), may be overlaid to increase accuracy of space characterization.

At step 156, the generated map may be sent to other devices. The other devices may display the map or otherwise use it (e.g., use in navigation for a robot or the like). At step 157, a request may be sent to a mobile device (e.g., mobile device 121) to annotate the map in order to indicate type of obstructions, type of materials, etc., which may help during the iterative process, such as when using machine learning algorithms or the like.

Figure 4:
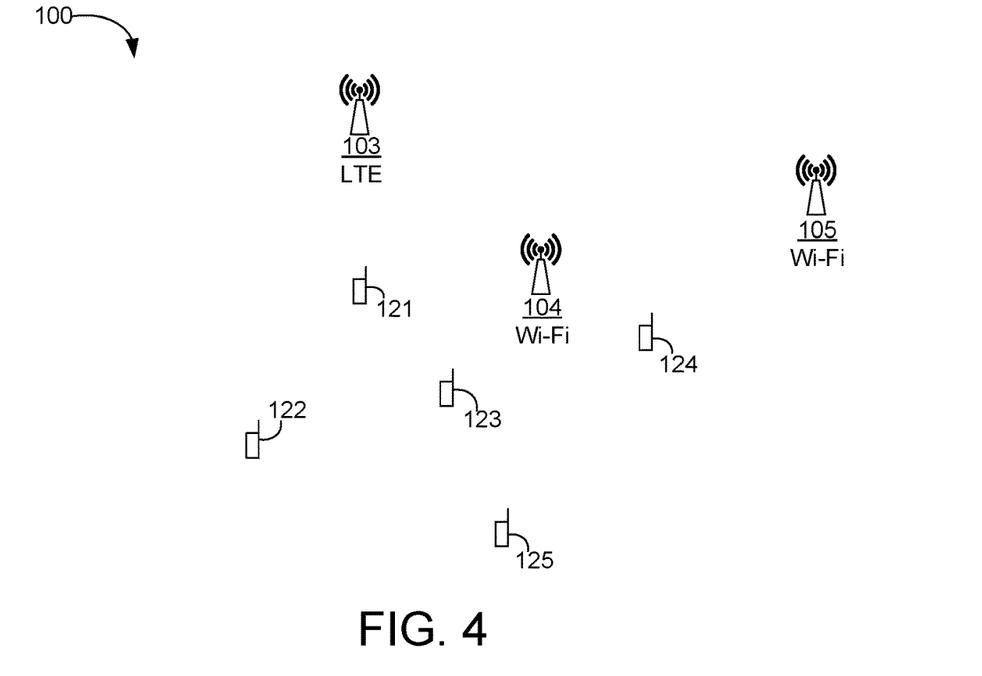
FIG. 4 illustrates a progression of an exemplary generated map based on the space characterization.
Figure 5:
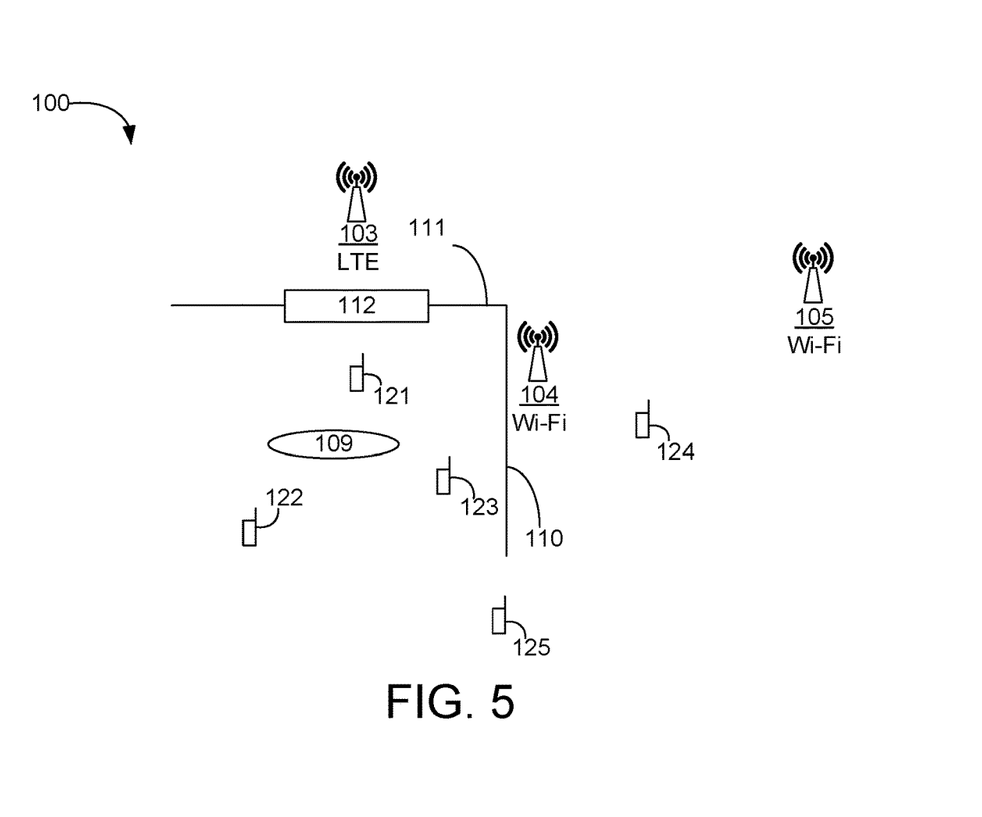
FIG. 5 illustrates a progression of an exemplary generated map based on the space characterization.
Figure 6:
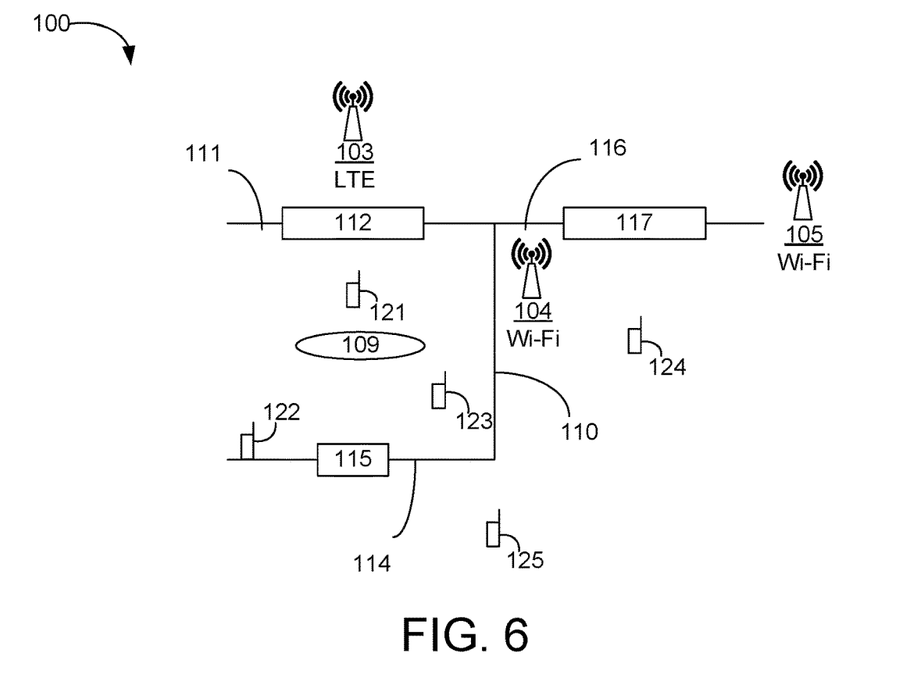
FIG. 6 illustrates a progression of an exemplary generated map based on the space characterization.
Figure 7:
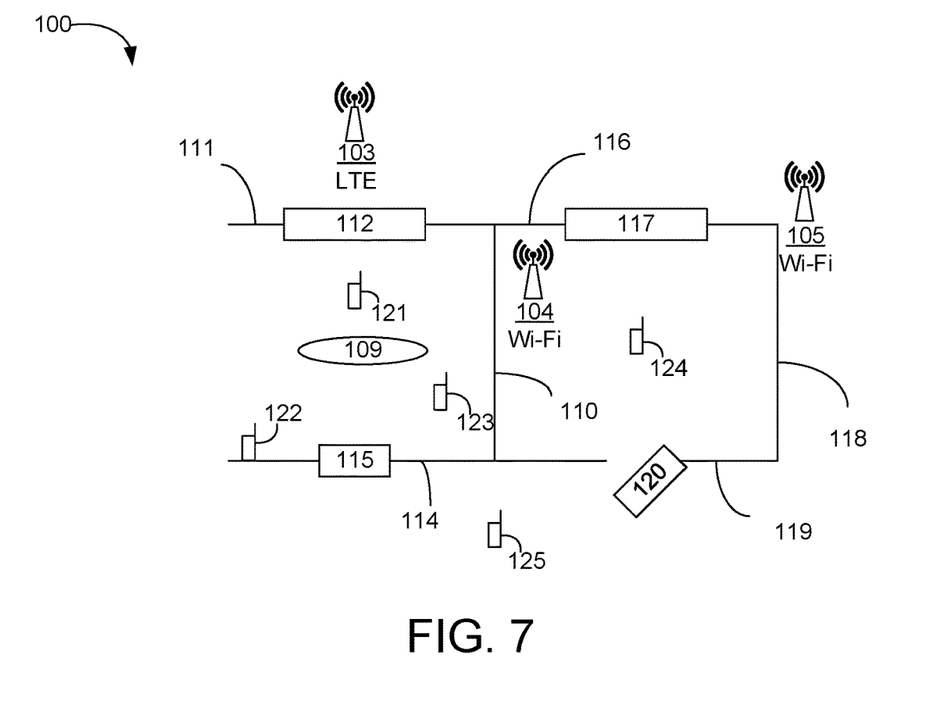
FIG. 7 illustrates a progression of an exemplary generated map based on the space characterization.
Figure 8:
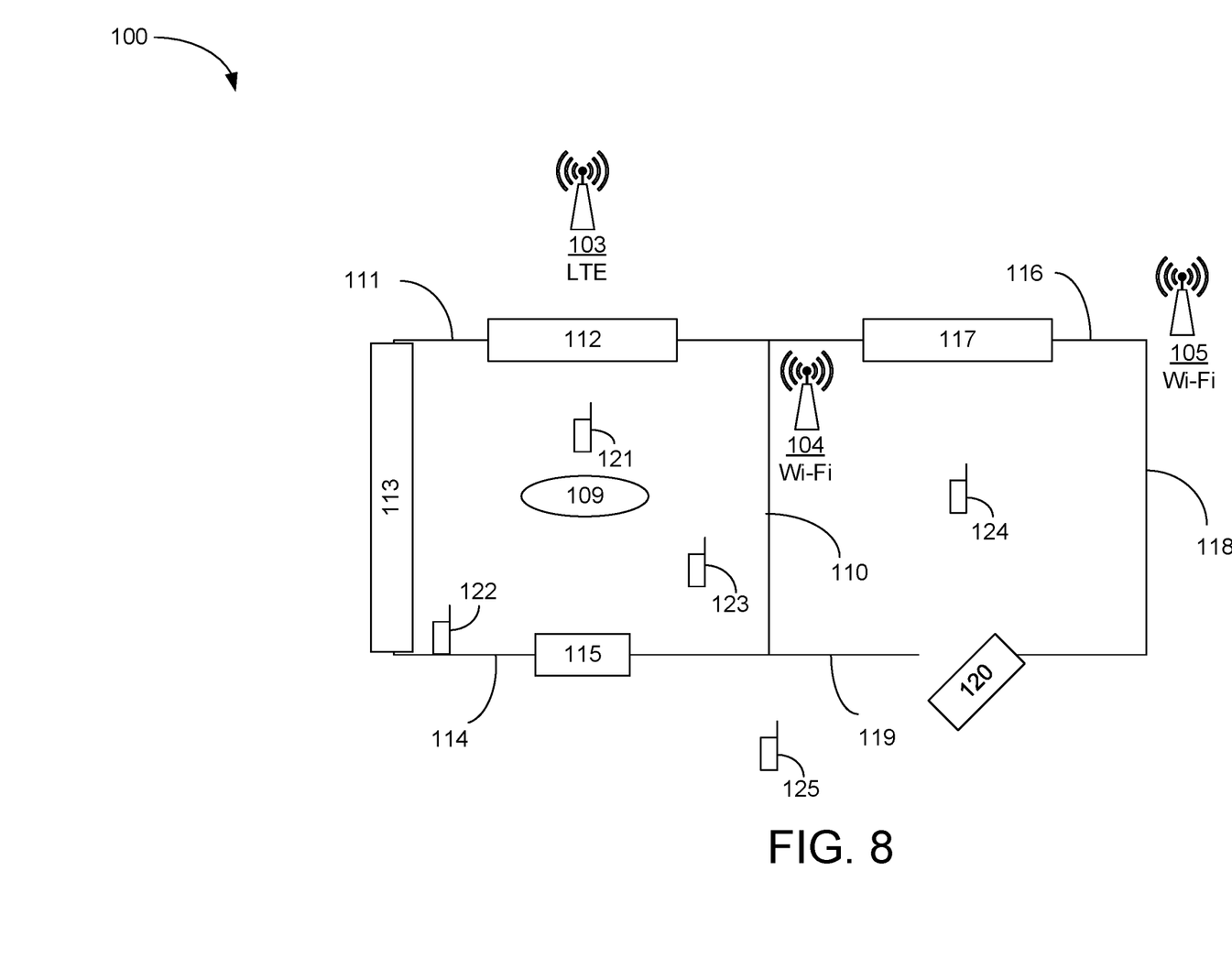
FIG. 8 illustrates a progression of an exemplary generated map based on the space characterization.

FIG. 4-FIG. 8 illustrate a progression of an exemplary generated map based on the space characterization as disclosed herein. With reference to FIG. 4, there may be an initial determination of the location of each wireless device in space. FIG. 5 illustrates an exemplary generated map based on a first processing of obtained wireless information for space characterization in view of the location of mobile device 121. FIG. 6 illustrates an exemplary generated map based on a second processing of obtained wireless information for space characterization in view of the location of mobile device 123 and the first processing. FIG. 7 illustrates an exemplary generated map based on a third processing of obtained wireless information for space characterization in view of the location of mobile device 125, the first processing, and second processing. FIG. 8 illustrates an exemplary generated map based on a fourth processing of obtained wireless information for space characterization in view of the location of mobile device 122, the first processing, second processing, and third processing. And so forth and so on. It is contemplated herein that this the process is iterative and the map may be updated based on movement of mobile devices into or out of a location, a period of time, or the like.

Further considerations associated with space characterization are discussed below. Conventionally the use of weak signal strength is to determine whether to boost power. Here it may be used to determine obstructions. The disclosed space characterization may consider signal reflection or signal diffraction to determine the objects in a space (e.g., room) to generate a map. Backend coordination of multiple devices may assist in this space characterization. The disclosed space characterization system may be considered passive because much of the wireless device information may be obtained during the act of normal communication between devices. The disclosed space characterization system may use ubiquitous EM radios (e.g. on devices, mobiles, towers, etc.) and the intelligent combination of those readings, which may be unlike conventional systems. With these readings, static and moving objects may be detected, while predicting improvement areas (spatially or EM) and accommodating multiple radio spectra. Areas of interest associated with the disclosed space characterization may include: (1) EM-based sensing of objects and room configuration; (2) device collaboration across different EM spectra; or (3) determination of expired or aging objects within a map and opportunistic requests.

The maps generated herein may be used with autonomous vehicles or unmanned vehicles. The unmanned vehicles may be autonomous or semi-autonomous and may travel by air, land, or sea. An example use case may involve integrating the map associated with the space characterization disclosed herein with an autonomous robotic vacuum cleaner. The space characterization mapping may be used instead of or in conjunction with other space mapping techniques, such as camera-based or laser-based systems. It is contemplated herein that other unmanned vehicles or autonomous vehicles (including robots) may use space characterization disclosed herein.

For clarity, robots are further defined below. A robot is a mechanical agent, usually an electromechanical machine that is guided by a computer program or electronic circuitry, and thus a type of an embedded system. Robots have been widely used today for wide range of industries (e.g., oil drilling, factory automation, underwater discovery, etc.). Conventional robots require dedicated and special purpose hardware/software resource, which impose significant limitation. Conventional robots lacks flexibility and are incapable to adapt when environment, application, and event changes. Robots may be of any type (e.g., bipedal or quadrupedal; autonomous or non-autonomous. In general, humanoid robots may have a torso, a head, two arms, and two legs, but it is contemplated that some forms of humanoid robots may model only part of the body, such as from the waist up or just an arm(s). A robot may be defined an actuated mechanism programmable in two or more axes with a degree of autonomy, moving within its environment, to perform intended tasks. See ISO 8373:2012(en) (incorporated by reference in its entirety). An autonomous robot is a robot that performs behaviors or tasks with a high degree of autonomy, which is particularly desirable in fields such as space exploration, household maintenance (such as cleaning), waste water treatment and delivering goods and services. A fully autonomous robot may: gain information about the environment; work for an extended period without human intervention; move a part of itself throughout its operating environment without human assistance; or avoid situations that are harmful to people, property, or itself unless those are part of its design specifications.

Such a system may be engaged to determine the validity of a spatial map and thereby provide guarantees for ephemeral accuracy. In determining validity of a spatial map, the system may periodically receive updates for one or more locations corresponding to a three dimensional map by normal device operation. Specifically, as devices (e.g., autonomous or human-held) move about a room, occasional updates for those spatial regions will be received and added to the system, even if those updates are largely redundant with respect to previously known information. However, such updates may be recorded with a timestamp to indicate the recency of updates such that proposed locations on a map have an indicator of when the object in the map was last determined. In another example, there may be areas of a map that receive updates with very low frequency or are determined to be aged with respect to the rest of the map. Here, the system may passively accept updates from devices through normal operation (at low frequency), or it may instruct devices that are nearby those poorly updated regions to coordinate in atypical operations. For example, instead of utilizing aggregations of normal EM readings a cellular device and a Wi-Fi device (a computer), the system may instruct the two devices to opportunistically try to contact each other (via Bluetooth, Wi-Fi, etc.) such that additional readings that are explicitly within the room may be obtained. Ideally, these atypical operations would only be triggered for devices that are proximal to the low-frequency updates, but the system may generically accommodate (and opportunistically activate) the devices according to detected needs.

The disclosed subject matter may include: (1) continuous multi-device indoor position mapping with passive or active radio alone; (2) high-accuracy room measurement without optic device input that may complement costly SLAM and other GPU-centric operations that are conventionally required for computer vision techniques; (3) multi-device collaboration and coordination to improve measurement resolution (coarse to fine) as needed by the overall system or opportunistically from extra observations of devices on different spectral ranges; (4) low-latency mapping updates using different frequencies for different size objects and closer real-time tracking and object updates; or (5) 3D measurement of object and room via multiple device collaboration determine EM performance in a room simultaneously.

Technical effects may include: (1) shared mapping database of indoor locations for inter-localization; (2) EM collaboration system for computation of positional and spectra field strength at different locations; (3) device collaboration across manufacturers and spectra by standardized protocol and transform specification; (4) management of timing for remapping of a room (detecting objects that moved or changed room configuration) automatically; (5) high accuracy room measurement using different spectra; or (6) low-latency mapping updates managed with coarse-to-fine resolution from any available EM signal and reporting.

Figure 9:
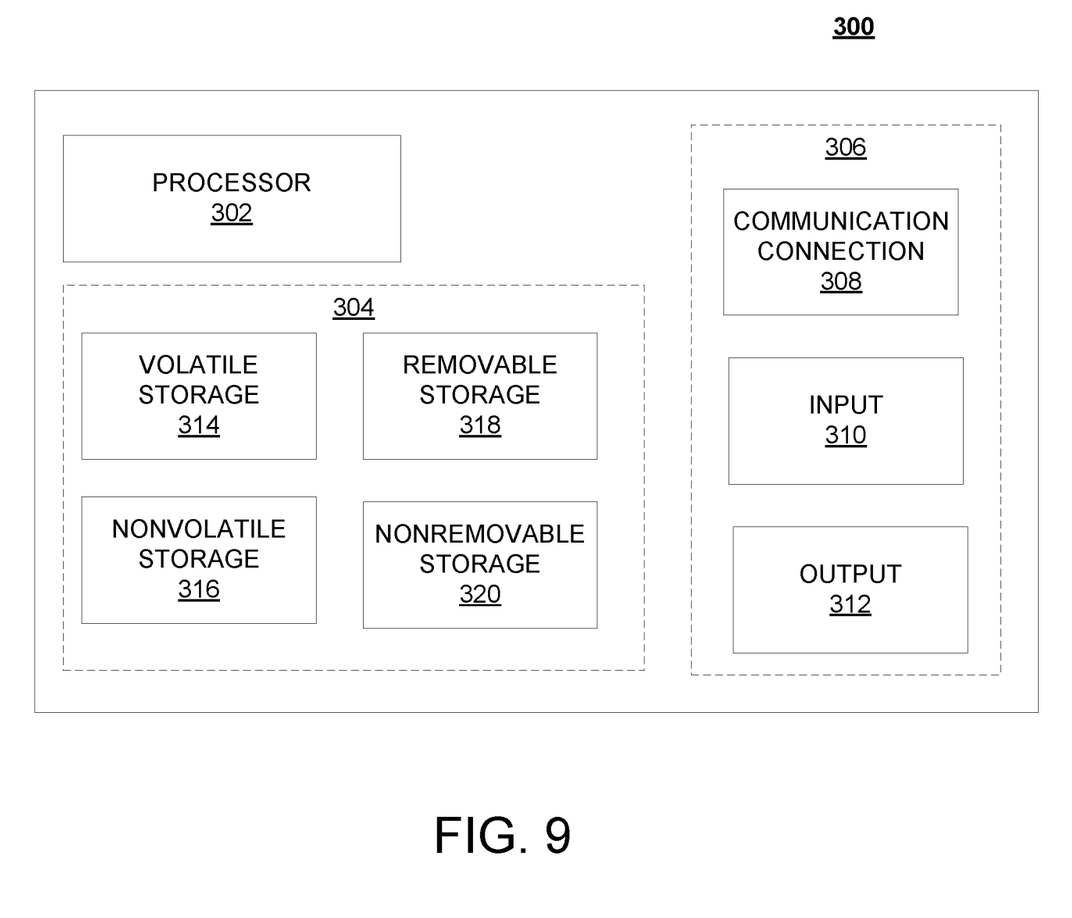
FIG. 9 illustrates a schematic of an exemplary network device.

FIG. 9 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 9 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 9 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 9) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 10:
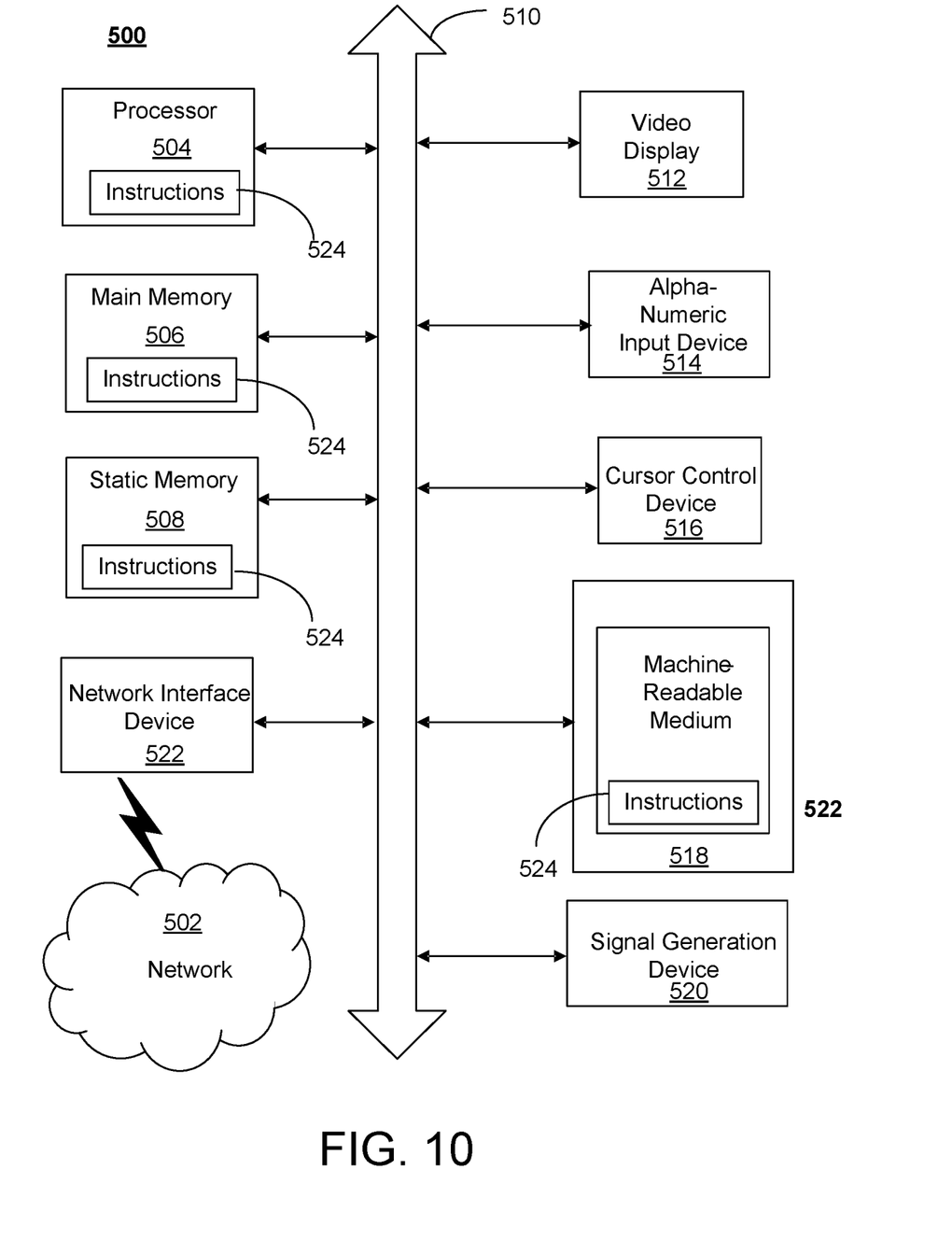
FIG. 10 illustrates an exemplary communication system that provides wireless telecommunication services over wireless communication networks.

FIG. 10 depicts an exemplary diagrammatic representation of a machine in the form of a computer system 500 within which a set of instructions, when executed, may cause the machine to perform any one or more of the methods described above. One or more instances of the machine can operate, for example, as processor 302, base station 103—base station 105 or mobile device 121—mobile device 125, server 101, and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which space characterization can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—space characterization—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

In an example, a system may include a processor and a memory coupled with the processor that effectuates operations. The operations may include obtaining wireless device information from a plurality of devices; determining a location of each device of the plurality of devices based on the wireless device information; determining a subset of the plurality of devices based on a threshold location; determining an obstruction in an area within the threshold location based on comparing the wireless device information of each device of the subset of the plurality of devices; and based on the determined obstruction in the area, generating a map of the area that includes a representation of the obstruction. The system may determine the least obstructive (or best transmission) volume for EM. This could then be extended to give favorable zone information for wireless devices being able to communicate with each other. This favorable zone information may be based on the determined obstructions or previously generated map and provided in a favorable zone map. The favorable zone map may be a heat map of the favorable (or not favorable) zones for wireless communication between devices.

What is claimed:

1. An apparatus comprising:
   a processor; and
   a memory coupled with the processor, the memory storing executable instructions that when executed by the processor cause the processor to effectuate operations comprising:
   obtaining wireless device information from a plurality of devices;
   determining, based on the wireless device information, a location of each device of the plurality of devices relative to an indoor area, wherein the indoor area is characterized based on comparing the wireless device information of a first device of the plurality of devices to at least wireless device information of a second device of the plurality of devices, wherein the first device and the second device are within a subset of the plurality of devices;
   determining the subset of the plurality of devices based on an indoor threshold location;
   determining an obstruction in a first area within the indoor threshold location based on comparing the wireless device information of the first device of the subset of the plurality of devices to at least at least the wireless device information of the second device of the subset of the plurality of devices; and
   based on the determined obstruction in the first area, generating an indoor map that comprises the first area, wherein the indoor map includes a representation of the obstruction.

2. The apparatus of claim 1, wherein the wireless device information comprises signal strength of each device of the subset of the plurality of devices.

3. The apparatus of claim 1, wherein the wireless device information is sent by each device of the plurality of devices.

4. The apparatus of claim 1, wherein the determining the subset of the plurality of devices is further based on wireless device identifier of a device of the plurality of devices.

5. The apparatus of claim 1, the operations further comprising determining a type of the obstruction based on spectrum of a device of the plurality of devices.

6. The apparatus of claim 1, the operations further comprising determining a composition of the obstruction based on spectrum of a device of the plurality of devices.

7. The apparatus of claim 1, the operations further comprising determining, based on the generated indoor map, a favorable zone for wireless communication between the plurality of devices.

8. A method comprising:
obtaining wireless device information from a plurality of devices;
determining, based on the wireless device information, a location of each device of the plurality of devices relative to an indoor area, wherein the indoor area is characterized based on comparing the wireless device information of a first device of the plurality of devices to at least wireless device information of a second device of the plurality of devices, wherein the first device and the second device are within a subset of the plurality of devices;
determining the subset of the plurality of devices based on an indoor threshold location;
determining an obstruction in a first area within the indoor threshold location based on comparing the wireless device information of the first device of the subset of the plurality of devices to at least at least the wireless device information of the second device of the subset of the plurality of devices; and
based on the determined obstruction in the first area, generating an indoor map that comprises the first area, wherein the indoor map includes a representation of the obstruction.

9. The method of claim 8, wherein the wireless device information comprises signal strength of each device of the subset of the plurality of devices.

10. The method of claim 8, wherein the wireless device information is sent by each device of the plurality of devices.

11. The method of claim 8, wherein the determining the subset of the plurality of devices is further based on wireless device identifier of a device of the plurality of devices.

12. The method of claim 8, further comprising determining a type of the obstruction based on spectrum of a device of the plurality of devices.

13. The method of claim 8, further comprising determining a composition of the obstruction based on spectrum of a device of the plurality of devices.

14. A non-transitory computer readable storage medium storing computer executable instructions that when executed by a computing device cause said computing device to effectuate operations comprising:
obtaining wireless device information from a plurality of devices;
determining, based on the wireless device information, a location of each device of the plurality of devices relative to an indoor area, wherein the indoor area is characterized based on comparing the wireless device information of a first device of the plurality of devices to at least wireless device information of a second device of the plurality of devices, wherein the first device and the second device are within a subset of the plurality of devices;
determining the subset of the plurality of devices based on an indoor threshold location;
determining an obstruction in a first area within the indoor threshold location based on comparing the wireless device information of the first device of the subset of the plurality of devices to at least at least the wireless device information of the second device of the subset of the plurality of devices; and
based on the determined obstruction in the first area, generating an indoor map that comprises the first area, wherein the indoor map includes a representation of the obstruction.

15. The computer readable storage medium of claim 14, wherein the wireless device information comprises signal strength of each device of the subset of the plurality of devices.

16. The computer readable storage medium of claim 14, wherein the wireless device information is sent by each device of the plurality of devices.

17. The computer readable storage medium of claim 14, wherein the determining the subset of the plurality of devices is further based on wireless device identifier of a device of the plurality of devices.

18. The computer readable storage medium of claim 14, the operations further comprising determining a type of the obstruction based on spectrum of a device of the plurality of devices.

19. The computer readable storage medium of claim 14, the operations further comprising determining a composition of the obstruction based on spectrum of a device of the plurality of devices.

20. An apparatus comprising:
a processor; and
a memory coupled with the processor, the memory storing executable instructions that when executed by the processor cause the processor to effectuate operations comprising:
obtaining wireless device information from a plurality of devices;
determining a location of each device of the plurality of devices based on the wireless device information;
determining a subset of the plurality of devices based on an indoor threshold location;
determining an obstruction in an area within the threshold location based on comparing the wireless device information of each device of the subset of the plurality of devices;
based on the determined obstruction in the area, generating an indoor map of the area that includes a representation of the obstruction; and
determining a composition of the obstruction based on spectrum of a device of the plurality of devices.

* * * * *